(12) United States Patent
Jeon

(10) Patent No.: US 7,402,974 B2
(45) Date of Patent: Jul. 22, 2008

(54) DEVICE FOR DETECTING LIFT OF AUTONOMOUS MOBILE ROBOT

(75) Inventor: Hyeong-shin Jeon, Gwangmyeong-si (KR)

(73) Assignee: LG Electronics Inc., Seoul (KR)

( * ) Notice: Subject to any disclaimer, the term of this patent is extended or adjusted under 35 U.S.C. 154(b) by 246 days.

(21) Appl. No.: 11/298,519

(22) Filed: Dec. 12, 2005

(65) Prior Publication Data

US 2006/0220606 A1  Oct. 5, 2006

(30) Foreign Application Priority Data

Mar. 31, 2005   (KR) .................. 10-2005-0027170

(51) Int. Cl.
*G05B 19/10*  (2006.01)

(52) U.S. Cl. ............. 318/567; 318/568.11; 318/568.16; 180/65.1; 180/65.5

(58) Field of Classification Search ................. 318/567, 318/568.11, 568.12, 568.16; 180/65.1, 65.5
See application file for complete search history.

(56) References Cited

U.S. PATENT DOCUMENTS

| | | | | |
|---|---|---|---|---|
| 4,977,639 A | * | 12/1990 | Takahashi et al. ............. 15/319 |
| 5,548,511 A | * | 8/1996 | Bancroft ........................ 701/23 |
| 5,942,869 A | * | 8/1999 | Katou et al. ........... 318/568.12 |
| 6,076,226 A | * | 6/2000 | Reed ............................ 15/319 |
| 6,481,515 B1 | * | 11/2002 | Kirkpatrick et al. ........ 180/65.1 |
| 2003/0060928 A1 | * | 3/2003 | Abramson et al. .......... 700/245 |
| 2004/0093650 A1 | * | 5/2004 | Martins et al. ................. 901/1 |

FOREIGN PATENT DOCUMENTS

| | | |
|---|---|---|
| JP | 60-218122 A | 10/1985 |
| JP | 07-079890 A | 3/1995 |

* cited by examiner

*Primary Examiner*—Rina I Duda
(74) *Attorney, Agent, or Firm*—Birch, Stewart, Kolasch & Birch, LLP

(57) ABSTRACT

Disclosed herein is a device for detecting lift of an autonomous mobile robot. The device comprises at least one detection unit to detect lift of the main body of the robot during driving of the robot and to generate and output the lift detection signal, and a controller to control driving of the robot, and to output the driving stop signal to a driving motor after generating a driving stop signal for stopping driving of the robot according to the lift detection signal transmitted from the detection unit. When the robot is lifted by a user, the device stops driving of the motor in response to the lift of the robot, thereby eliminating additional operation of the user to stop driving of the robot as well as protecting the user.

16 Claims, 5 Drawing Sheets

(a)

(b)

(a)

(b)

(a)

(b)

(a)

(b)

(a)

(b)

DEVICE FOR DETECTING LIFT OF AUTONOMOUS MOBILE ROBOT

BACKGROUND OF THE INVENTION

1. Field of the Invention

The present invention generally relates to an autonomous mobile robot, and, more particularly, to a device for detecting lift of an autonomous mobile robot.

2. Description of the Related Art

Pet robots, cleaning robots and the like (which will be referred to hereinafter as an "autonomous mobile robot") are well known in the art. Generally, the autonomous mobile robot is designed to autonomously move about under control of an obstacle detecting sensor, a fall prevention sensor, a pressure sensor, etc., without specific orientation control by a user.

A conventional autonomous mobile robot generally comprises an infrared sensor used as the obstacle detecting sensor. While traveling and performing a specific operation, the autonomous mobile robot generates infrared light through a light emitter of the infrared sensor. When the infrared light is reflected by the obstacle and returns back to the robot, the robot receives the infrared light through a light receiver of the sensor, and determines whether an obstacle is present or not. When it is determined that an obstacle is present, the robot changes its driving direction, and avoids the obstacle.

However, since the autonomous mobile robot as described above generally employs the sensor for detecting the obstacle in front of the robot or for preventing falling of the robot, it cannot detect lift of a body of the robot.

For example, a child may lift the main body of the robot, and in this case, it is necessary to stop driving of the robot for security of the child. In addition, the main body of the robot can be lifted by the user to prevent the robot from moving into a dangerous place such as a fireplace, and in this case, it is also necessary to stop driving of the robot. However, the conventional autonomous mobile robot does not comprise such a function to stop driving of the robot.

SUMMARY OF THE INVENTION

The present invention has been made to solve the above problems, and it is an object of the present invention to provide a device for detecting lift of an autonomous mobile robot, which can detect lift of the robot in an unexpected circumstance, and stop driving of the robot for security of a user.

In accordance with one aspect of the present invention, the above and other objects can be accomplished by the provision of a device for detecting lift of an autonomous mobile robot, comprising: at least one detection unit to detect lift of a main body of the robot during driving of the robot and to generate and output a lift detection signal; and a controller to control driving of the robot, to generate a driving stop signal for stopping driving of the robot according to the lift detection signal transmitted from the detection unit, and to output the driving stop signal to a driving motor.

According to the present invention as described above, when the autonomous mobile robot is lifted by a user, the device can stop driving of the robot in response to lift of the robot, thereby protecting the user.

In accordance with another aspect of the present invention, a device for detecting lift of an autonomous mobile robot is provided, comprising: a plurality of fall prevention sensors provided at one side of the robot to output different distance signals according to a measured distance after measuring the distance of the robot from the ground; a detection unit to detect danger of falling or lift of the robot according to the distance signals transmitted from the fall prevention sensors and to generate and output a precipice detection signal or a lift detection signal; and a controller to control driving of the robot, to generate a driving direction change signal for changing a driving direction of the robot or a driving stop signal for stopping driving of the robot according to a precipice detection signal or the lift detection signal transmitted from the detection unit, and to output the driving direction change signal or the driving stop signal to a driving motor.

According to the present invention as described above, when the autonomous mobile robot is lifted by a user, the device can also stop driving of the robot in response to lift of the robot, thereby protecting the user.

BRIEF DESCRIPTION OF THE DRAWINGS

The foregoing and other objects and features of the present invention will be more clearly understood from the following detailed description taken in conjunction with the accompanying drawings, in which.

DESCRIPTION OF THE PREFERRED EMBODIMENTS

Figure 1:
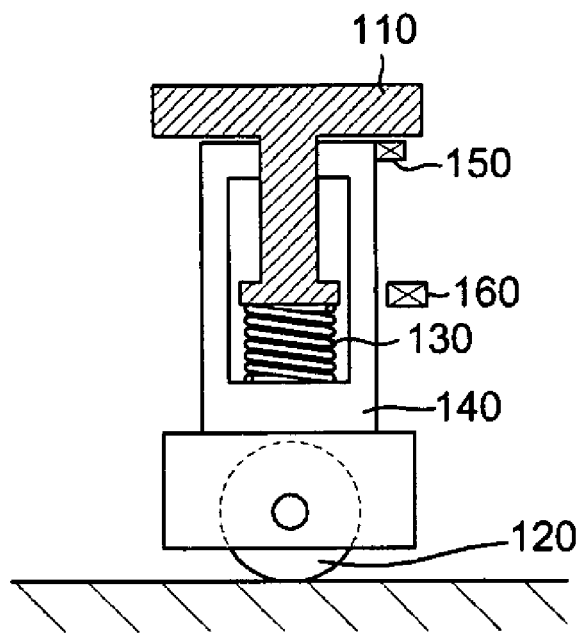
FIGS. 1a and 1b are cross-sectional views illustrating the location of a detection unit, which is one component of a device for detecting lift of an autonomous mobile robot according to one embodiment of the present invention.
Figure 1:
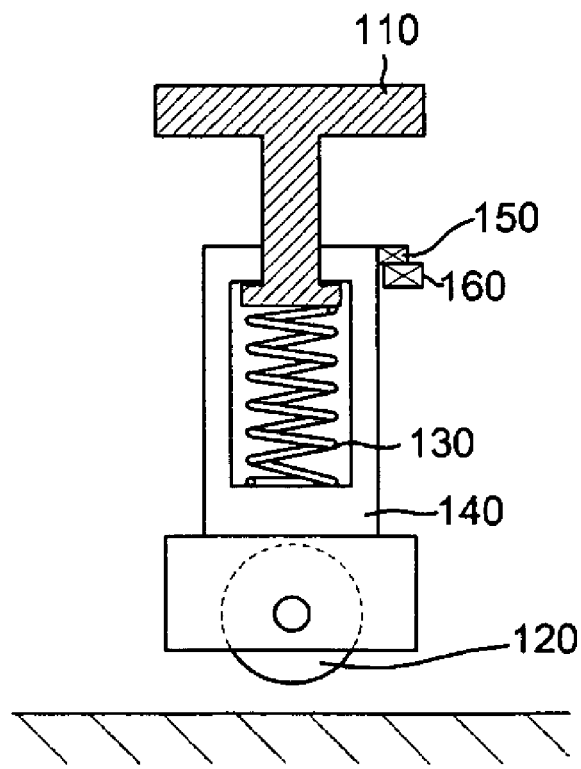

Preferred embodiments will now be described in detail with reference to the accompanying drawings. In description of the present invention, if it is considered that a detailed description of well-known functions or constructions is not directly related to the subject matter of the present invention, the detailed description thereof will be omitted.

FIGS. 1a and 1b are cross-sectional views illustrating the location of a detection unit 160, which is one component of a device for detecting lift of an autonomous mobile robot according to one embodiment of the present invention, and FIGS. 2a and 2b are circuit diagrams illustrating a procedure for generating an output signal by the detection unit 160 shown in FIGS. 1a and 1b.

The device for detecting lift of the autonomous mobile robot according to one embodiment of the invention may generally comprise a detection unit 160 to detect the lift of the robot during driving of the robot, and a controller to stop driving of the robot according to a signal output from the detection unit 160.

In other words, as shown in FIGS. 1a and 1b, a driving unit of the autonomous mobile robot comprises a mounting member 110, wheels 120, a spring 130, and a sliding pipe 140, and the device for detecting the lift of the robot according to the embodiment comprises a detection jaw 150 and a detection unit 160 attached to the driving unit, so that a controller of the device receives an electric signal generated according to whether the detection jaw 150 and the detection unit 160 are brought into contact with each other, and detects the lift of the robot.

More specifically, the mounting member 110 is a frame constituting the driving unit of the robot, and fixed to one end of a main body of the robot. The sliding pipe 140 can move vertically along the mounting member 110 acting as a shaft of the sliding pipe 140.

The wheels 120 are mounted independently of the sliding pipe 140, and enable the autonomous mobile robot to move with stability and balance. The spring 130 serves to impart resilience to the wheels 120, and is equipped in the sliding pipe 140. When the wheels 120 are brought into contact with the ground, the spring 130 is compressed as shown in FIG. 1a, and when the wheels 120 are separated from the ground, it elongates as shown in FIG. 1b to impart resilience to the wheels 120.

The sliding pipe 140 moves vertically along the mounting member 110 acting as the shaft of the sliding pipe 140, and serves to buffer the wheels 120. When the wheels 120 are brought into the ground, the spring 130 is compressed as shown in FIG. 1a so that the sliding pipe 140 contacts an upper portion of the mounting member 110, and when the wheels 120 are separated from the ground, it elongates as shown in FIG. 1b to impart resilience to the wheels 120 so that the sliding pipe 140 moves towards the ground.

The detection jaw 150 is equipped to the one end of the sliding pipe 140 to cooperate with the detection unit 160.

The detection unit 160 detects the lift of the autonomous mobile robot, and is equipped to the driving unit so as to face the detection jaw 150. The detection unit 160 may comprise various sensors such as an infrared sensor which can detect a distance to the detection jaw 150, or a contact sensor, for example, a switch, which can generate different signals according to whether the detection unit 160 is brought into contact with the detection jaw 150 or not. According to this embodiment, the detection unit 160 comprises a switch SW and a plurality of resistors as shown in FIGS. 2a and 2b.

Figure 2:
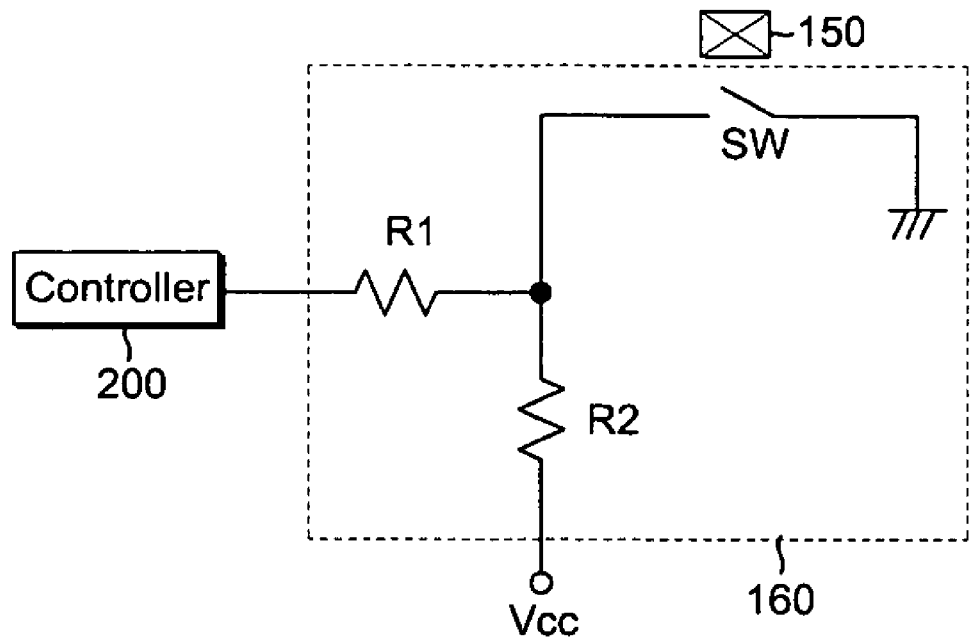
FIGS. 2a and 2b are circuit diagrams illustrating a procedure for generating an output signal by the detection unit shown in FIGS. 1a and 1b, respectively.
Figure 2:
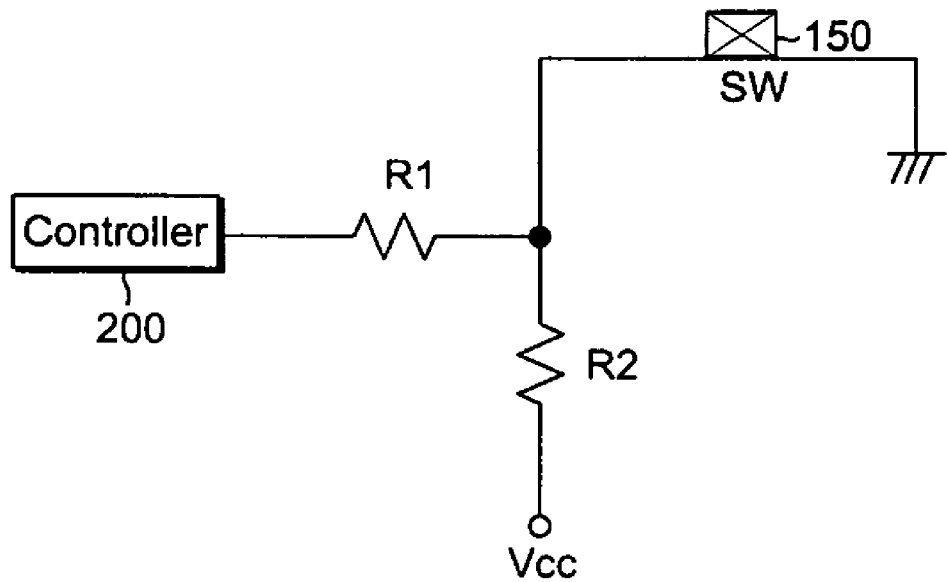

An operation of the device for detecting the lift of the autonomous mobile robot according to the present embodiment will be described with reference to FIGS. 1a to 2b. First, when the robot travels along the ground as shown in FIG. 1a, the spring 130 is compressed, and the sliding pipe 140 is brought into contact with the upper portion of the mounting member 110, so that the detection jaw 150 positioned at one end of the sliding pipe 140 is separated from the detection unit 160.

Thus, with circuitry as shown in FIG. 2a, the controller 200 receives a non-lifted detection signal of a high level, and determines that the robot is in a normal driving state.

However, when the robot is lifted as shown in FIG. 1b by a user or the like, the wheels 120 are separated from the ground, and at the same time, the spring 130 elongates to allow the sliding pipe 140 to move towards the ground. In this case, the detection jaw 150 positioned at one end of the sliding pipe 140 is brought into contact with the detection unit 160.

When the detection jaw 150 is brought into contact with the detection unit 160, the detection unit 160 generates a lift detection signal which detects the lift of the main body of the robot, and outputs it to the controller 200.

Thus, with circuitry as shown in FIG. 2b, the controller 200 receives the lift detection signal of a low level, and determines that the robot is in a lifted state. Then, the controller 200 generates a driving stop signal to stop driving of the robot, and outputs it to a driving motor to stop driving the motor.

As a result, it is not necessary for the user to perform any additional operation to stop the robot when lifting the robot, which enhances user convenience. In addition, even if the robot is lifted, there is no possibility that the robot will injure the user.

Preferably, the device for detecting the lift of the autonomous mobile robot comprises one or more detection units, and when the controller receives lift detection signals from all detection units, the controller determines that the robot is in a lifted state, generates the driving stop signal to stop driving of the robot, and outputs it to the driving motor of the robot.

Preferably, when the controller does not receive the lift detection signal from one or more of the detection units, the controller determines that the robot is released from the lifted state, generates a driving restart signal to restart driving of the robot, and outputs it to the driving motor of the robot.

In accordance with another embodiment of the present invention, in order to detect lift of the autonomous mobile robot, a device for detecting the lift of the robot may comprise a sensor for preventing falling of the robot, i.e. a fall prevention sensor, which is generally equipped to the autonomous mobile robot. The fall prevention sensor is a sensor for detecting a distance to the ground, and can be embodied by an infrared sensor. In the present embodiment, plural fall prevention sensors are equipped to a lower end of a main body of the robot. Generally, when a receiving period for signals transmitted from transmitters of the fall prevention sensors exceeds a predetermined period, a controller determines that the robot is in danger that may cause the robot to fall, and controls the robot to change a driving direction of the robot and avoid a precipice.

Preferably, the device for detecting the lift of the autonomous mobile robot comprises the plurality of fall preventing sensors, which are equipped to one side of the robot to measure distances from the ground, and to output different signals according to the measured distances.

Each of the fall prevention sensors outputs a signal according to the measured distance, and the detection unit detects danger of falling or lift of the robot according to the distance signal input to the detection unit. Then, the detection unit generates and outputs a fall detection signal or a lift detection signal.

The controller generates a driving direction change signal for changing a driving direction of the robot or a driving stop signal for stopping driving of the robot according to a precipice detection signal or the lift detection signal transmitted from the detection unit, and outputs the driving direction change signal or the driving stop signal to the driving motor.

In addition, preferably, when the distance signal transmitted from one or some fall prevention sensors is greater than or equal to a predetermined distance, the detection unit determines that the robot is in danger of falling, generates the precipice detection signal, and outputs it to the driving motor. Preferably, when the distance signals transmitted from all fall prevention sensors are greater than or equal to a predetermined distance, the detection unit determines that the robot is in the lifted state, and outputs the lift detection signal after generating the lift detection signal.

In addition, preferably, when the distance signals transmitted from all fall prevention sensors are less than the predetermined distance, the detection unit determines that the robot is released from the lifted state, and outputs the release signal after generating the release signal. Preferably, when the controller receives the release signal transmitted from the detection unit, the controller generates a driving restart signal to restart driving of the autonomous mobile robot, and outputs the driving restart signal to the driving unit.

Figure 3:
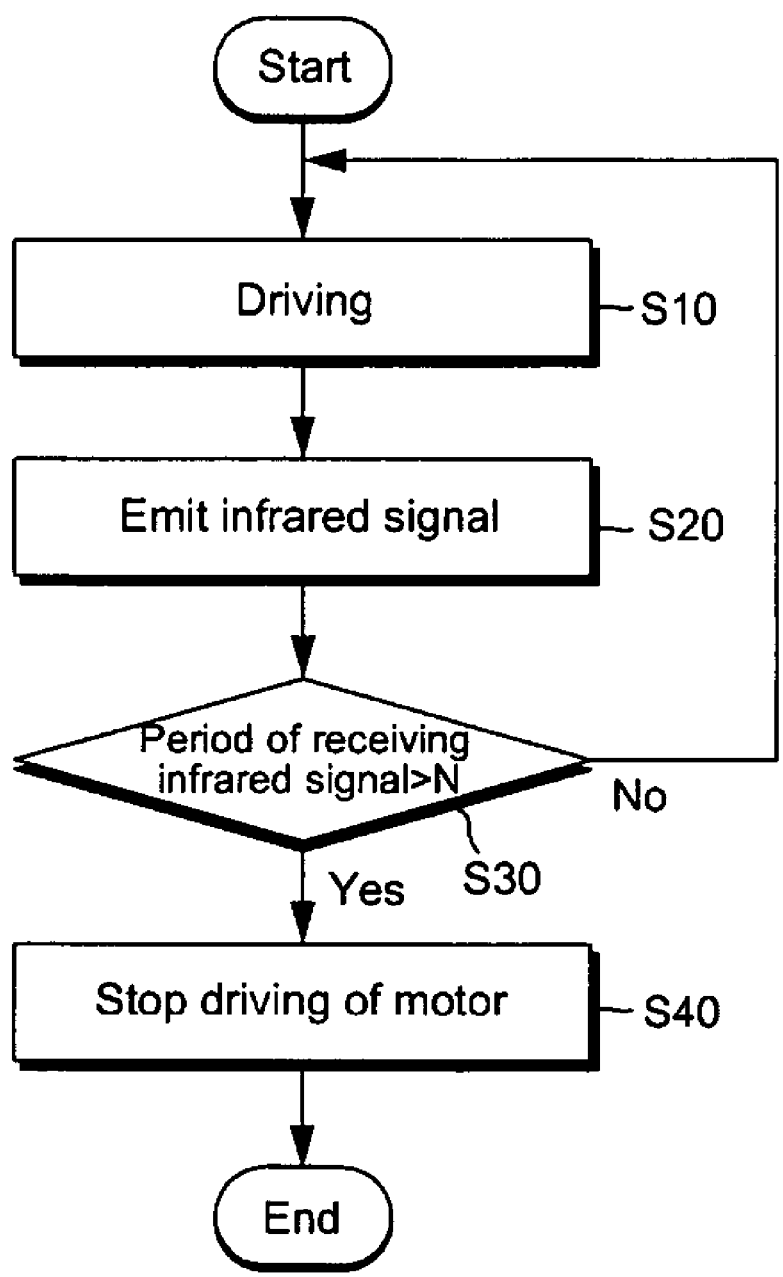
FIG. 3 is a flow diagram illustrating operation of a device for detecting lift of an autonomous mobile robot according to another embodiment of the present invention.

A method for determining whether the autonomous mobile robot is lifted or not using the plural fall prevention sensors described above will be described with reference to FIG. 3 hereinafter.

According to a command from a user, a controller 200 allows the autonomous mobile robot to travel (S10). In order to detect whether a precipice is located in a driving direction, infrared light transmitters of the respective fall prevention sensors attached to the lower end of the robot emit infrared signals according to control of the controller 200 (S20). While controlling emission of the infrared signals through the infrared light transmitters, the controller 200 checks a time taken for infrared light receivers of the fall prevention sensors to receive the infrared signals. Then, the controller detects whether the time for receiving the infrared signals exceeds a predetermined time N or not (S30). Preferably, the predetermined time N is greater than a time for determining whether a precipice is present in the driving direction.

If it is determined from the result of the step S30 that a time for receiving the infrared signals emitted from one or some of the plural fall prevention sensors exceeds the predetermined time N and a time for receiving the infrared signal emitted from other fall prevention sensors does not exceed the predetermined time N, the controller 200 determines that the precipice is present in the driving direction, and allows the robot to change the driving direction. However, if it is determined that the time for receiving the infrared signals emitted from all fall prevention sensors exceeds the predetermined time N, the controller 200 determines that the autonomous mobile robot is lifted by the user, and controls the driving motor of the robot to stop (S40). Then, the method for determining the lift of the autonomous mobile robot according to the present embodiment is completed.

As a result, it is not necessary to perform any additional operation to stop the robot when the user lifts the robot, which enhances user convenience, and even if the robot is lifted, it is impossible for the robot to injure the user.

Figure 4:
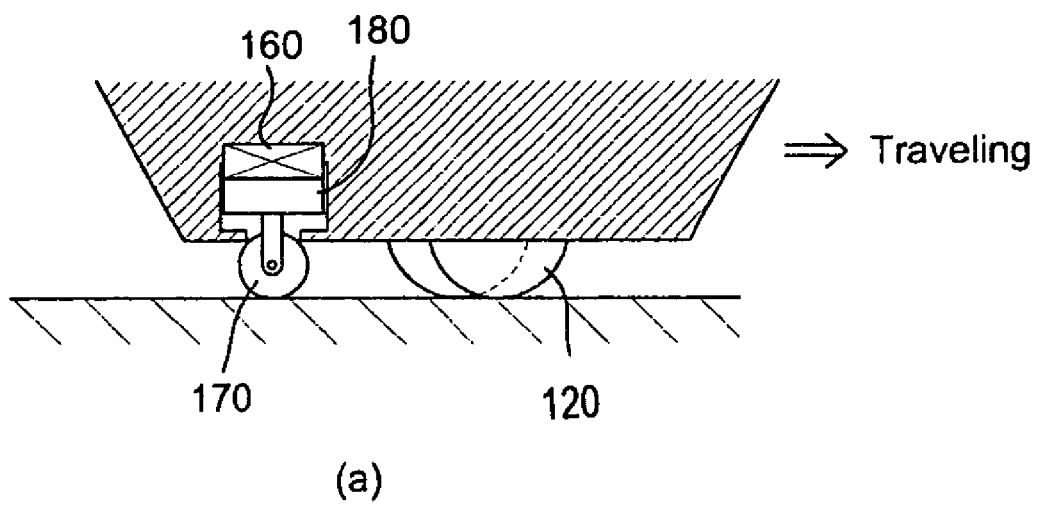
FIGS. 4a and 4b are cross-sectional views illustrating the location of a detection unit, which is one component of a device for detecting lift of an autonomous mobile robot according to yet another embodiment of the present invention.
Figure 4:
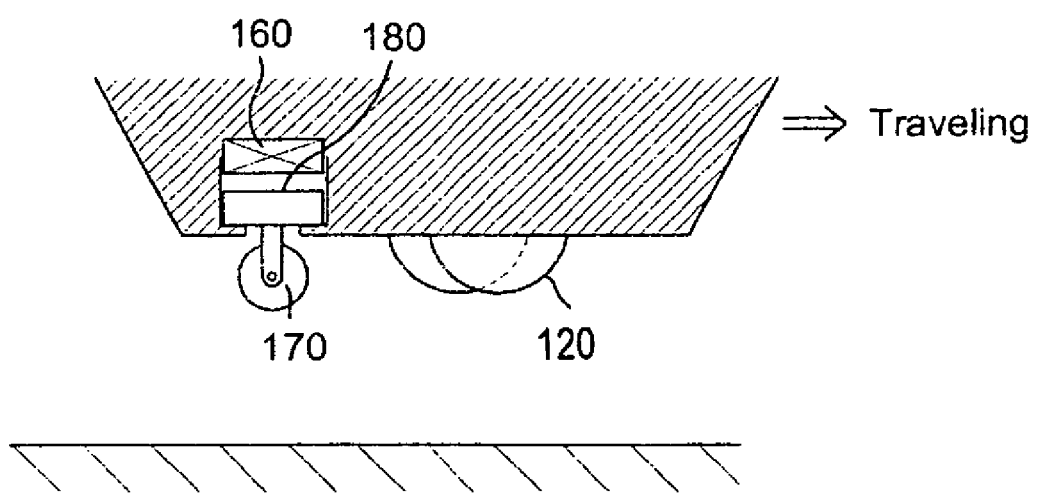
Figure 5:
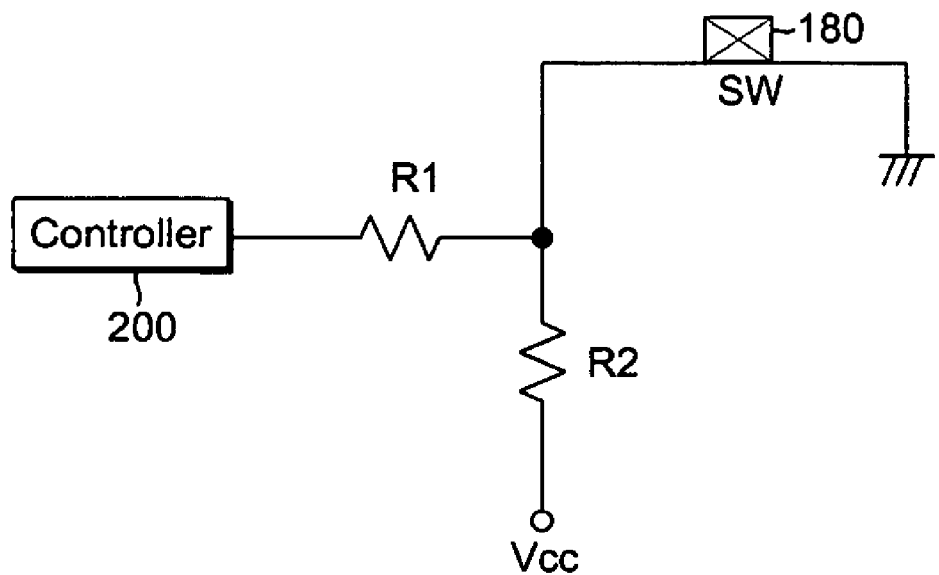
FIGS. 5a and 5b are circuit diagrams illustrating a procedure of generating an output signal via the detection unit shown in FIGS. 4a and 4b, respectively.
Figure 5:
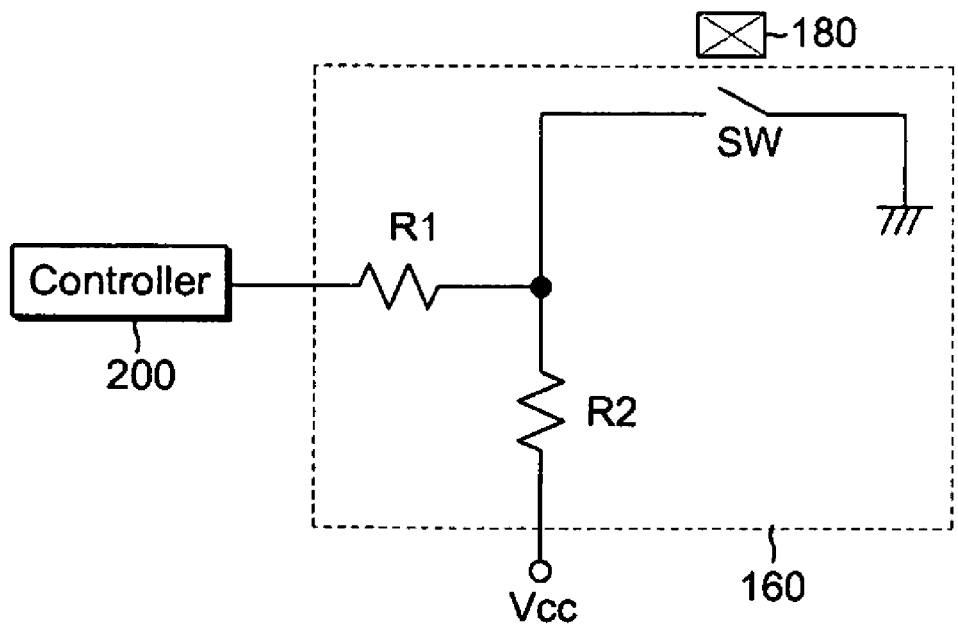

A device for detecting lift of an autonomous mobile robot according to yet another embodiment of the invention, and operation thereof will be described with reference to FIGS. 4 and 5.

As in the device shown in FIGS. 1a and 1b, the device for detecting the lift of the autonomous mobile robot according to this embodiment can also be embodied by a detection unit and a controller 200. As shown in FIGS. 4a and 4b, the device for detecting the lift of the autonomous mobile robot according to this embodiment comprises a detection unit 160 equipped to the autonomous mobile robot having an assistant wheel 170 so that the controller 200 determines the lift of the robot when the detection unit 160 is separated from a fixing member 180.

In FIGS. 4a and 4b, the assistant wheel 170 is located at a center of one side of a lower surface of the robot, and is connected to the fixing member 180 to assist wheels so as to allow the robot to move with stability and balance.

The fixing member 180 is a driving shaft of the assistant wheel 170. Since the fixing member 180 is not fixed to the robot, it can move up and down in connection with the assistant wheel 170. In other words, when the assistant wheel 170 is brought into contact with the ground, the fixing member 180 moves upward, and when the assistant wheel 170 is separated from the ground, the fixing member 180 moves towards the ground.

The detection unit 160 detects the lift of the autonomous mobile robot, and is equipped to a main body of the robot to face the fixing member 180. The detection unit 160 may be embodied by a sensor which can detect a distance to the fixing member 180. In some cases, the detection unit 160 can be embodied by a switch which can generate different signals according to whether the detection unit 160 is brought into contact with the fixing member 180. According to this embodiment, the detection unit 160 comprises a switch SW and a plurality of resistors as shown in FIGS. 5a and 5b.

An operation of the device for detecting the lift of the autonomous mobile robot according to this embodiment will be described with reference to FIGS. 4a to 5b. First, when the robot travels along the ground as shown in FIG. 4a, the fixing member 180 is brought into contact with the detection unit 160. Thus, with circuitry as shown in FIG. 5a, the controller 200 receives a non-lifted detection signal of a low level, and determines that the robot is in a normal driving state.

However, when the robot is lifted as shown in FIG. 4b by a user or the like, the assistant wheel 170 is separated from the ground, and at the same time, the fixing member 180 is also separated from the detection unit 160.

Thus, with circuitry as shown in FIG. 5b, the controller 200 determines that the robot is in a lifted state when receiving a lift detection signal of a high level, and stops driving of the motor.

As a result, it is not necessary for the user to perform any additional operation to stop driving of the robot when lifting the robot, which enhances user convenience, and even if the robot is lifted, it is impossible for the robot to injure the user.

As apparent from the above description, the present invention has an advantage in that, when the autonomous mobile robot travels to a dangerous place such as a fireplace or when the robot is lifted due to unexpected circumstances, for example, by a child, the device of the invention detects such circumstances, and stops driving of the motor, thereby eliminating additional operation of the user to stop driving of the robot as well as protecting the user.

It should be understood that the embodiments and the accompanying drawings have been described for illustrative purposes and the present invention is limited by the following claims. Further, those skilled in the art will appreciate that various modifications, additions and substitutions are allowed without departing from the scope and spirit of the invention according to the accompanying claims.

What is claimed is:

1. A device for detecting lift of an autonomous mobile robot, the device comprising:
   a mounting member fixed to one end of a main body of the autonomous mobile robot and having a shaft extension portion extending toward a ground surface the autonomous mobile robot is to be positioned on;
   a sliding pipe connected to a wheel of the autonomous mobile robot and configured to slide vertically along the shaft extension portion of the mounting member;
   a biasing member disposed within the sliding pipe between an end of the shaft extension portion and an inner surface of the mounting member and configured to provide a biasing force against the shaft extension portion;
   at least one detection unit disposed on an outside of the sliding pipe; and
   a detection jaw mounted at one side of the sliding pipe and configured to face the at least one detection unit such that when the autonomous mobile robot is placed on the ground surface, a weight of the autonomous mobile robot pushes the shaft extension portion toward the ground surface such that the biasing member is compressed and the at least one detection unit and the detection jaw are separated from each other, and such that when the autonomous mobile robot is lifted from the ground surface, the biasing member provides the biasing force against the shaft extension portion such that the sliding pipe slides away from the end of the shaft extension portion and the at least one detection unit and the detection jaw communicate or contact each other.

2. The device according to claim 1, further comprising:
a controller configured to control a driving operation of the autonomous mobile robot, and to output a driving stop signal to a driving motor for stopping the driving operation of the robot when the at least one detection unit and the detection jaw communicate or contact each other.

3. The device according to claim 1, wherein the at least one detection unit comprises a contact sensor configured to generate signals of different levels according to contact with the detection jaw.

4. The device according to claim 1, wherein the at least one detection unit comprises an infrared sensor configured to emit an infrared signal to the detection jaw, and to generate signals of different levels according to infrared signals reflected back to the at least one detection unit by the detection jaw.

5. The device according to claim 2, wherein the at least one detection unit includes a plurality of detection units, and when the controller receives a signal from each of the plurality of detection units that the detection jaw communicates or contacts with, the controller determines that the autonomous mobile robot is in a lifted state, and outputs the driving stop signal to the driving motor of the autonomous mobile robot to stop the driving operation of the autonomous mobile robot.

6. The device according to claim 2, wherein the at least one detection unit includes a plurality of detection units, and when the controller does not receives a signal from one or more detection units among the plurality of detection units, the controller determines that the autonomous mobile robot is released from a lifted state, and outputs a driving restart signal to the driving motor of the autonomous mobile robot to restart the driving operation of the autonomous mobile robot.

7. The device according to claim 1, wherein the autonomous mobile robot is a cleaning robot.

8. A device for detecting lift of an autonomous mobile robot, the device comprising:
a plurality of fall prevention sensors provided at a lower end of a main body of the autonomous mobile robot that faces a ground surface the autonomous mobile robot is to be positioned on and configured to respectively measure distances between the ground surface and the lower end of the main body of the autonomous mobile robot and to output different distance signals according to the measured distances;
a detection unit configured to detect that the autonomous mobile robot is in danger of falling or has been lifted on the ground surface according to the different distance signals and to output a precipice detection signal or a lift detection signal based on the different distance signals; and
a controller configured to control a driving operation of the autonomous mobile robot, to generate a driving direction change signal for changing a driving direction of the autonomous mobile robot or a driving stop signal for stopping the driving operation of the autonomous mobile robot according to the precipice detection signal or the lift detection signal output from the detection unit.

9. The device according to claim 8, wherein, when the distance signals output from one or some of the plurality of fall prevention sensors are greater than or equal to a predetermined distance, the detection unit detects that the autonomous mobile robot is in danger of falling, and outputs the precipice detection signal.

10. The device according to claim 8, wherein, when the distance signals output from all of the plurality of fall prevention sensors are greater than or equal to a predetermined distance, the detection unit detects that the autonomous mobile robot is in a lifted state, and outputs the lift detection signal.

11. The device according to claim 10, wherein, when the distance signals output from all of the plurality of fall prevention sensors are less than the predetermined distance, the detection unit determines that the autonomous mobile robot is released from the lifted state, and outputs a release signal, and when the controller receives the release signal output from the detection unit, the controller outputs a driving restart signal to the driving unit to restart the driving operation of the autonomous mobile robot.

12. The device according to claim 8, wherein each of the plurality of fall prevention sensors comprises an infrared sensor to emit infrared signals to the ground surface and signals of different levels according to the infrared signals reflected to the fall prevention sensor by the ground surface.

13. The device according to claim 8, wherein the autonomous mobile robot is a cleaning robot.

14. An autonomous mobile robot, comprising:
a main body;
a driving motor configured to drive main wheels of the autonomous mobile robot;
a groove provided in the main body and including a detection unit;
a fixing member configured to move up and down in the groove provided in the main body when the autonomous mobile robot is placed onto and picked up from a ground surface; and
an assistant wheel connected to the fixing member and configured to assist the main wheels of the autonomous mobile robot so as to allow the autonomous mobile robot to move with stability and balance but not being driven by the driving motor,
wherein when the autonomous mobile robot is placed onto the ground surface, the assistant wheel contacts the ground surface thereby moving the fixing member up in the groove to contact the detection unit in the groove, and when the autonomous mobile robot is lifted up from the ground surface, the assistant wheel does not contact the ground surface thereby moving the fixing member down in the groove such that the fixing member does not contact the detection unit in the groove.

15. The autonomous mobile robot according to claim 14, further comprising: a controller configured to control a driving operation of the autonomous mobile robot, and to generate a driving stop signal for stopping the driving operation of the autonomous mobile robot when the fixing member does not contact the detection unit.

16. The autonomous mobile robot according to claim 14, wherein the controller is further configured to generate a restart driving signal for restarting the driving operation of the autonomous mobile robot when the fixing member again contacts the detection unit.

* * * * *